(12) United States Patent
Hirn et al.

(10) Patent No.: US 10,040,564 B2
(45) Date of Patent: Aug. 7, 2018

(54) MANAGING AN INPUT DEVICE (71) Applicant: General Electric Company, Schenectady, NY (US)

(72) Inventors: John Joseph Hirn, Cincinnati, OH (US); Michael A. Clawson, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 97 days.

(21) Appl. No.: 15/341,038

(22) Filed: Nov. 2, 2016

(65) Prior Publication Data

US 2018/0118360 A1   May 3, 2018

(51) Int. Cl.
*G01C 23/00* (2006.01)
*B64D 31/00* (2006.01)
*F02C 9/00* (2006.01)
*F02C 3/04* (2006.01)

(52) U.S. Cl.
CPC ............ *B64D 31/00* (2013.01); *F02C 3/04* (2013.01); *F02C 9/00* (2013.01); *F05D 2220/323* (2013.01)

(58) Field of Classification Search
CPC .............. B64D 31/00; F02C 3/04; F02C 9/00
USPC ............................................................ 701/3
See application file for complete search history.

(56) References Cited

U.S. PATENT DOCUMENTS

| | | | |
|---|---|---|---|
| 3,575,529 A | 4/1971 | Bierman | |
| 3,813,063 A | 5/1974 | Martin | |
| 3,869,800 A | 3/1975 | Bartlett et al. | |
| 4,012,015 A | 3/1977 | Nelson et al. | |
| 4,282,710 A | 8/1981 | Avant | |
| 5,018,922 A | 5/1991 | Yoshinada et al. | |
| 7,322,345 B2 * | 1/2008 | Saito | F02D 41/221 123/529 |
| 7,826,954 B2 * | 11/2010 | Muramatsu | F01D 21/003 477/30 |
| 8,321,119 B2 * | 11/2012 | Van Vactor | F02C 9/46 244/62 |
| 8,925,329 B2 | 1/2015 | Godel et al. | |
| 2003/0191565 A1 * | 10/2003 | Ostrom | F01D 21/00 701/29.2 |

(Continued)

*Primary Examiner* — Thomas G Black
*Assistant Examiner* — Luat T Huynh
(74) *Attorney, Agent, or Firm* — General Electric Company; Pamela Kachur (57) ABSTRACT

Systems and methods for managing an input device are provided. One example aspect of the present disclosure is directed to a method for managing an input device for an aerial vehicle. The method includes determining, by one or more controllers, whether a signal from the input device is indeterminate for more than a first threshold period of time. When the signal from the input device is indeterminate for more than the first threshold period of time, the method continues. The method includes determining, by the one or more controllers, a last valid signal from the input device. When the last valid signal from the input device is ON, the method includes determining, by the one or more controllers, whether a high pressure shut-off valve (HPSOV) is closed within a second threshold period of time. When the last valid signal from the input device is ON and when the HPSOV is closed, the method includes changing a position of the input device in a logic of the one or more controllers.

20 Claims, 6 Drawing Sheets

(56) References Cited

U.S. PATENT DOCUMENTS

2015/0114326 A1* 4/2015 Burkhardt ............. F02D 41/221
 123/41.86
2016/0207633 A1 7/2016 McWaters et al.
2016/0356227 A1* 12/2016 Akita ................. F02M 25/0836
2017/0218791 A1* 8/2017 Bujon ..................... F01D 15/12

* cited by examiner

MANAGING AN INPUT DEVICE

FIELD

The present subject matter relates generally to aerial vehicles.

BACKGROUND

Aerial vehicles can include a master lever switch. The master lever switch can correlate to an engine position. A full authority digital engine control (FADEC) of the engine can interpret signals from the master lever switch. The master lever switch can be transitioned from an "off" position to an "on" position when an engine is to be started. The master lever switch can be transitioned from an "on" position to an "off" position when the engine is to be shut down. In some aerial vehicles, communication from the master lever switch to the FADEC can be unreliable. When the FADEC does not receive signals from the master lever switch, the FADEC may not transition the engine in step with the position of the master lever switch.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method for managing an input device for an aerial vehicle. The method includes determining, by one or more controllers, whether a signal from the input device is indeterminate for more than a first threshold period of time. When the signal from the input device is indeterminate for more than the first threshold period of time, the method includes determining, by the one or more controllers, a last valid signal from the input device. When the signal from the input device is indeterminate for more than the first threshold period of time and when the last valid signal from the input device is indicative of a first state, the method includes determining, by the one or more controllers, whether a high pressure shut-off valve (HPSOV) is closed within a second threshold period of time. When the signal from the input device is indeterminate for more than the first threshold period of time and when the last valid signal from the input device is indicative of a first state and when the HPSOV is closed within a second threshold period of time, the method includes changing a position of the input device in a logic of the one or more controllers.

Another example aspect of the present disclosure is directed to a system for managing an input device for an aerial vehicle. The system includes an input device. The system includes a high pressure shut-off valve (HPSOV). The system includes one or more controllers. The one or more controllers are configured to determine whether a signal from the input device is indeterminate for more than a first threshold period of time. When the signal from the input device is indeterminate for more than the first threshold period of time, the one or more controllers are configured to determine a last valid signal from the input device. When the signal from the input device is indeterminate for more than the first threshold period of time and when the last valid signal from the input device is indicative of a first state, the one or more controllers are configured to determine whether the HPSOV is closed within a second threshold period of time. When the signal from the input device is indeterminate for more than the first threshold period of time and when the last valid signal from the input device is indicative of a first state and when the HPSOV is closed within the second threshold period of time, the one or more controllers are configured to change a position of the input device in a logic of the one or more controllers.

Other example aspects of the present disclosure are directed to systems, methods, vehicles, aerial vehicles, devices, non-transitory computer-readable media for managing an input device. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to managing an input device for an aerial vehicle. An aerial vehicle can include a master lever switch. The master lever switch can correlate to an engine position. The master lever switch can be transitioned from a first state (e.g., an "off" position) to a second state (e.g., an "on" position) when an engine is to be started. The master lever switch can be transitioned from the first state (e.g., an "on" position) to the second state (an "off" position) when the engine is to be shut down. One or more controllers (e.g., a full authority digital engine control (FADEC)) can interpret signals from the master lever switch.

In some aerial vehicles, communication of signals from the master lever switch to the one or more controllers can be known to be unreliable. However, the one or more controllers can receive a plurality of other signals from a plurality of other components. Communication of the plurality of other signals to the one or more controllers can be more reliable than the communication of signals from the master lever switch to the one or more controllers. When the one or more controllers determine that communication of signals from the master lever switch has become unreliable, the one or more controllers can use one or more of the plurality of signals from other components to determine what a position of the master lever switch should be in a logic of the one or more controllers.

For example, when the master lever switch transitions from an ON state to an OFF state, a high pressure shut-off valve (HPSOV) can transition from an "open" state to a "closed" state within a short period of time. Therefore, when the communication from the master lever switch to the one or more controllers has become unreliable, and the last signal the FADEC received from the master lever switch indicated that the master lever switch was an ON state, the one or more controllers can determine whether the HPSOV has transitioned from the "open" state to "closed" state within a short time. If so, the one or more controllers can transition the position of the master lever switch to the OFF state in the logic of the one or more controllers.

As an example, when the master lever switch transitions from an OFF state to an ON state, an aerial vehicle rotary selector switch can typically transition from an "off" state to a "start" state within a short period of time. Therefore, when the communication from the master lever switch to the one or more controllers has become unreliable, and the last signal the one or more controllers received from the master lever switch indicated that the master lever switch was in an OFF state, the one or more controllers can determine whether the aerial vehicle rotary selector switch has transitioned from an "off" state to a "start" state within a short time, and, if so, transition the position of the master lever switch to ON in the logic of the one or more controllers.

In this way, the systems and methods according to example aspects of the present disclosure can have a technical effect of determining a correct position in logic for an input device when communication with the input device is indeterminate. Other technical effects can be realized by example embodiments of the present disclosure.

Figure 1:
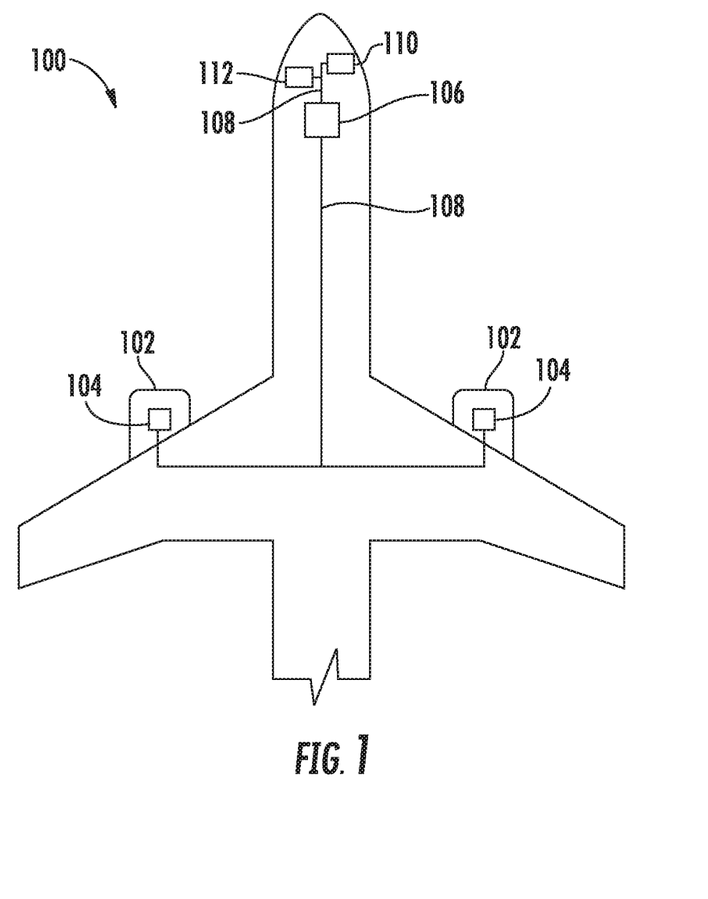
FIG. 1 depicts an example aerial vehicle according to example embodiments of the present disclosure.

FIG. 1 depicts an aerial vehicle 100 in accordance with an embodiment of the present disclosure. The aerial vehicle 100 can include one or more engines 102. In some implementations, one or more of the one or more engines 102 can be configured as one or more gas turbine engines. For example, the one or more engines 102 can include a compressor section, a combustion section, and a turbine section in serial flow order. One or more of the one or more engines 102 can be configured as a turbofan engine, a turbojet engine, a turboprop engine, a turboshaft engine, etc. In other implementations, one or more of the one or more engines 102 can be an internal combustion engine, or any other suitable engine for use in an aircraft. The aerial vehicle 100 can include one or more components 104, such as one or more full authority digital engine controls (FADEC) or one or more high pressure shut-off valves (HPSOV), an aerial vehicle rotary selector switch 112, and an input device 110, such as a master lever switch. The one or more components can communicate with one or more controllers 106 via a communication path 108. The communication path 108 can be, for example, a communication bus.

The numbers, locations, and/or orientations of the components of example aerial vehicle 100 are for purposes of illustration and discussion and are not intended to be limiting. Those of ordinary skill in the art, using the disclosures provided herein, shall understand that the numbers, locations, and/or orientations of the components of the aerial vehicle 100 can be adjusted without deviating from the scope of the present disclosure.

Figure 2:
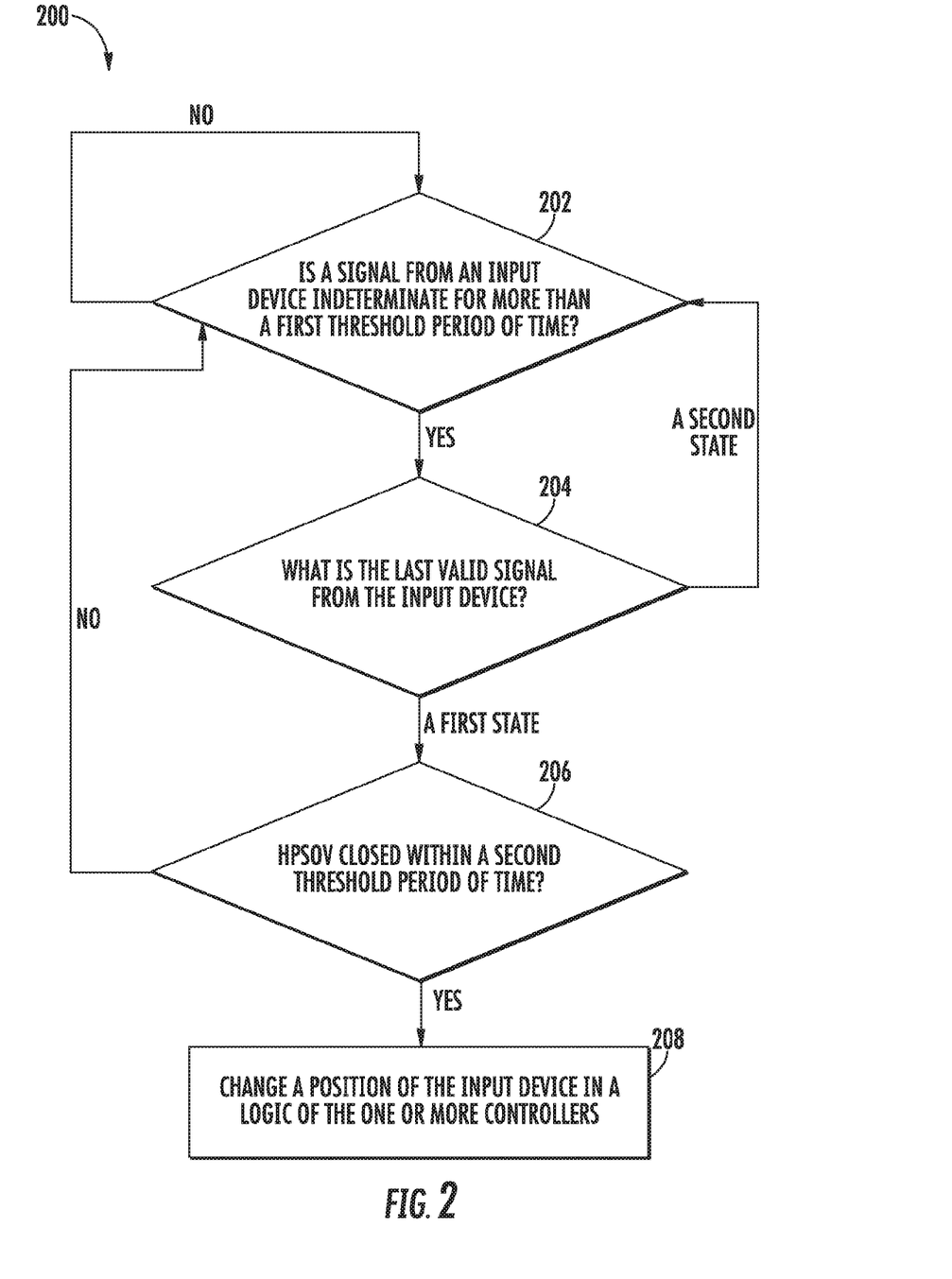
FIG. 2 depicts a flow diagram of an example method according to example embodiments of the present disclosure.

FIG. 2 depicts a flow diagram of an example method (200) for managing an input device for an aerial vehicle. The method of FIG. 2 can be implemented using, for instance, the control system 500 of FIG. 5. FIG. 2 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (202), a determination can be made of whether a signal from an input device is indeterminate for more than a first threshold period of time. For example, the control system 500 can determine whether a signal from an input device is indeterminate for more than a first threshold period of time. A valid signal from an input device can be a signal received in an expected format (e.g., structure, form, construct, etc.) for the input device. A signal from an input device can be indeterminate if, for example, a connection with the input device is lost or becomes unreliable, or if the signal is otherwise invalid for the input device. The input device can be a master lever switch. The first threshold period of time can be, for example, 500 milliseconds. Although 500 milliseconds is used as an example first threshold period of time, any other value can be used as the first threshold period of time. Determining whether a signal from the input device is indeterminate for more than a first threshold period of time can include determining at least one value from an engine interface unit (EIU) is indeterminate. The at least one value from the EIU can be from one of a bit 14 of the EIU or a bit 15 of the EIU. When a determination is made that a signal from the input device is not indeterminate for more than the first threshold period of time, the method 200 stays at (202). When a determination is made that a signal from the input device is indeterminate for more than the first threshold period of time, the method 200 moves to (204).

At (204), a determination is made of what was the last valid signal from the input device. For example, the control system 500 can determine what the last valid signal from the input device was. When a determination is made that the last valid signal from the input device was indicative of a first state, the method 200 can move to (206). The first state can be an ON state. When a determination is made that the last valid signal from the input device was indicative of a second state, the method 200 can return to (202). The second state can be an OFF state. Alternatively, when a determination is made that the last valid signal from the input device was indicative of the second state, a determination can be made of whether an aerial vehicle rotary selector switch is activated within a third threshold period of time. For example, the control system 500 can determine whether an aerial vehicle rotary selector switch is activated within a third threshold period of time. When a determination is made that the aerial vehicle rotary selector switch is activated within a third threshold period of time, the method 200 can move to (208). When a determination is made that the aircraft rotary selector switch is not activated within a third threshold period of time, the method 200 can return to (202). In another example, when a determination is made that the last valid signal from the input device was indicative of a second state, a determination can be made of whether the aerial vehicle is in flight. For example, the control system 500 can determine whether the aerial vehicle is in flight. When the determination is that the aerial vehicle is in flight, a position of the input device in a logic of the one or more controllers can be maintained and the method 200 can return to (202). When the determination is that the aerial vehicle is not in flight, a determination can be made of whether an aerial vehicle rotary selector switch is activated within a third threshold period of time. For example, the control system 500 can determine whether an aerial vehicle rotary selector switch is activated within a third threshold period of time. When a determination is made that the aerial vehicle rotary selector switch is activated within a third threshold period of time, the method 200 can move to (208). When a determination is made that the aircraft rotary selector switch is not activated within a third threshold period of time, the method 200 can return to (202). The third threshold period of time can be two minutes. Although two minutes is used as an example third threshold period of time, any other value can be used as the third threshold period of time.

At (206), a determination can be made of whether a high pressure shut-off valve (HPSOV) closed within a second threshold period of time. For example, the control system 500 can determine whether the HPSOV closed within a second threshold period of time. The second threshold period of time can be 5 seconds. Although 5 seconds is used as an example second threshold period of time, any other value can be used as the second threshold period of time. Determining whether the HPSOV is closed within a second threshold period of time can include evaluating two channels of the HPSOV for a position change. When a determination is made that the HPSOV closed within the second threshold period of time, the method 200 can move to (208). When a determination is made that the HPSOV did not close within the second threshold period of time, the method 200 can return to (202).

At (208), a position of the input device in a logic of one or more controllers can be changed. For example, the control system 500 can change a position of the input device in a logic of the control system 500. For example, when the last valid signal from the input device indicates that the input device is ON, the position of the input device can be changed from ON to OFF in the logic of the one or more controllers. As another example, when the last valid signal from the input device indicates that the input device is OFF, the position of the input device can be changed from OFF to ON in the logic of the one or more controllers. A full authority digital engine control (FADEC) can be and/or include the one or more controllers.

Figure 3:
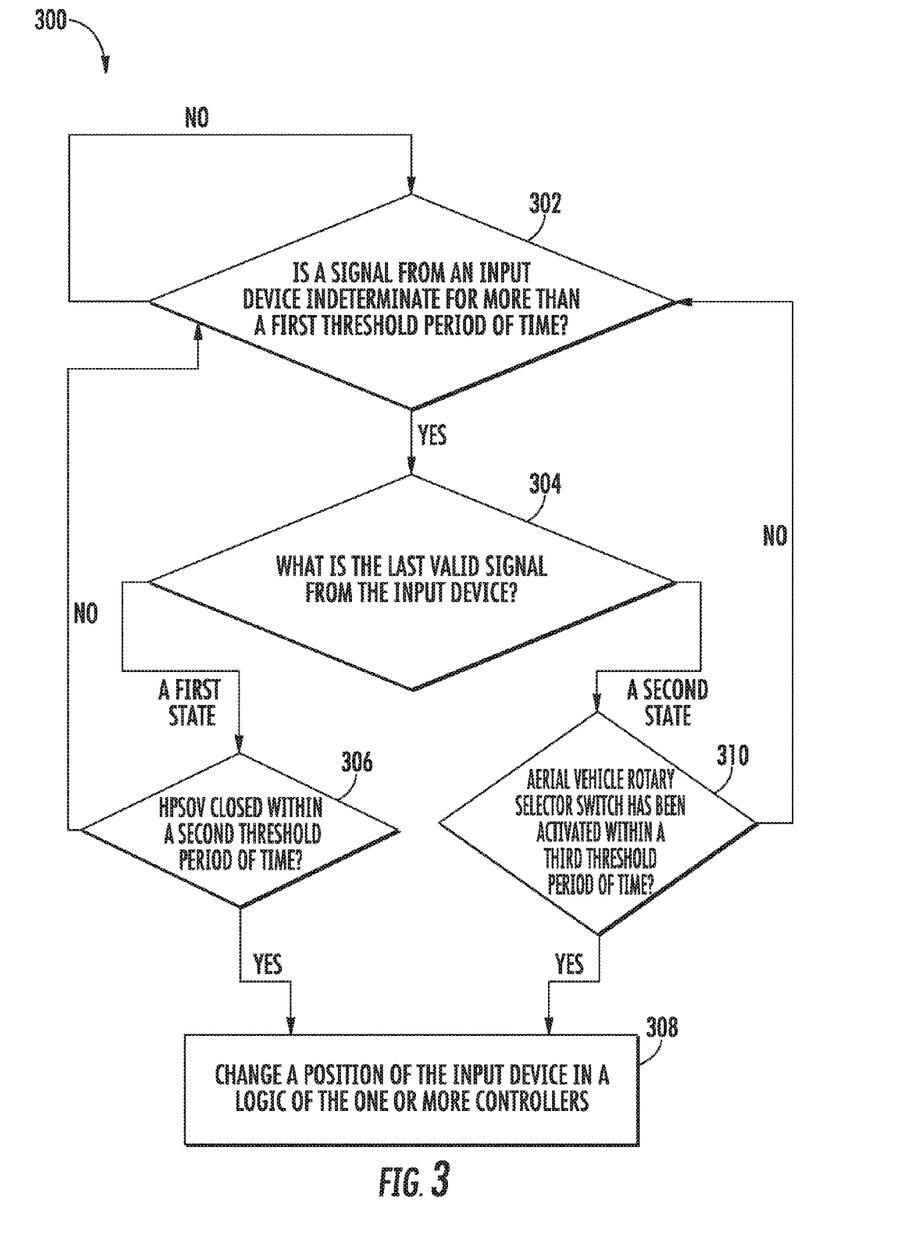
FIG. 3 depicts a flow diagram of an example method according to example embodiments of the present disclosure.

FIG. 3 depicts a flow diagram of an example method (300) for managing an input device for an aerial vehicle. The method of FIG. 3 can be implemented using, for instance, the control system 500 of FIG. 5. FIG. 3 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (302), a determination can be made of whether a signal from an input device is indeterminate for more than a first threshold period of time. For example, the control system 500 can determine whether a signal from an input device is indeterminate for more than a first threshold period of time. The input device can be a master lever switch. The first threshold period of time can be, for example, 500 milliseconds. Although 500 milliseconds is used as an example first threshold period of time, any other value can be used as the first threshold period of time. Determining whether a signal from the input device is indeterminate for more than a first threshold period of time can include determining at least one value from an engine interface unit (EIU) is indeterminate. The at least one value from the EIU can be from one of a bit 14 of the EIU or a bit 15 of the EIU. When a determination is made that a signal from the input device is not indeterminate for more than the first threshold period of time, the method 300 stays at (302). When a determination is made that a signal from the input device is indeterminate for more than the first threshold period of time, the method 300 moves to (304).

At (304), a determination is made of what was the last valid signal from the input device. For example, the control system 500 can determine what the last valid signal from the input device was. When a determination is made that the last valid signal from the input device was indicative of a first state, the method 300 can move to (306). The first state can be an ON state. When a determination is made that the last valid signal from the input device was indicative of a second state, the method 300 can move to (310). The second state can be an OFF state.

At (306), a determination can be made of whether a high pressure shut-off valve (HPSOV) closed within a second threshold period of time. For example, the control system 500 can determine whether the HPSOV closed within a second threshold period of time. The second threshold period of time can be 5 seconds. Although 5 seconds is used as an example second threshold period of time, any other value can be used as the second threshold period of time. Determining whether the HPSOV is closed within a second threshold period of time can include evaluating two channels of the HPSOV for a position change. When a determination is made that the HPSOV closed within the second threshold period of time, the method 300 can move to (308). When a determination is made that the HPSOV did not close within the second threshold period of time, the method 300 can return to (302).

At (308), a position of the input device in a logic of one or more controllers can be changed. For example, the control system 500 can change a position of the input device in a logic of the control system 500. For example, when the last valid signal from the input device is ON, the position of the input device can be changed from ON to OFF in the logic of the one or more controllers. As another example, when the last valid signal from the input device is OFF, the position of the input device can be changed from OFF to ON in the logic of the one or more controllers. A full authority digital engine control (FADEC) can be and/or include the one or more controllers.

At (310), a determination can be made of whether an aerial vehicle rotary selector switch is activated within a third threshold period of time. For example, the control system 500 can determine whether an aerial vehicle rotary selector switch is activated within a third threshold period of time. When a determination is made that the aerial vehicle rotary selector switch is activated within a third threshold period of time, the method 300 can move to (308). When a determination is made that the aircraft rotary selector switch is not activated within a third threshold period of time, the method 300 can return to (302). Alternatively, at (310), a determination can be made of whether the aerial vehicle is in flight. For example, the control system 500 can determine whether the aerial vehicle is in flight. When the determination is that the aerial vehicle is in flight, a position of the input device in a logic of the one or more controllers can be maintained and the method 300 can return to (302). When the determination is that the aerial vehicle is not in flight, a determination can be made of whether an aerial vehicle rotary selector switch is activated within a third threshold period of time. For example, the control system 500 can determine whether an aerial vehicle rotary selector switch is activated within a third threshold period of time. When a determination is made that the aerial vehicle rotary selector switch is activated within a third threshold period of time, the method 300 can move to (308). When a determination is made that the aircraft rotary selector switch is not activated within a third threshold period of time, the method 300 can return to (302). The third threshold period of time can be two minutes. Although two minutes is used as an example third threshold period of time, any other value can be used as the third threshold period of time.

Figure 4:
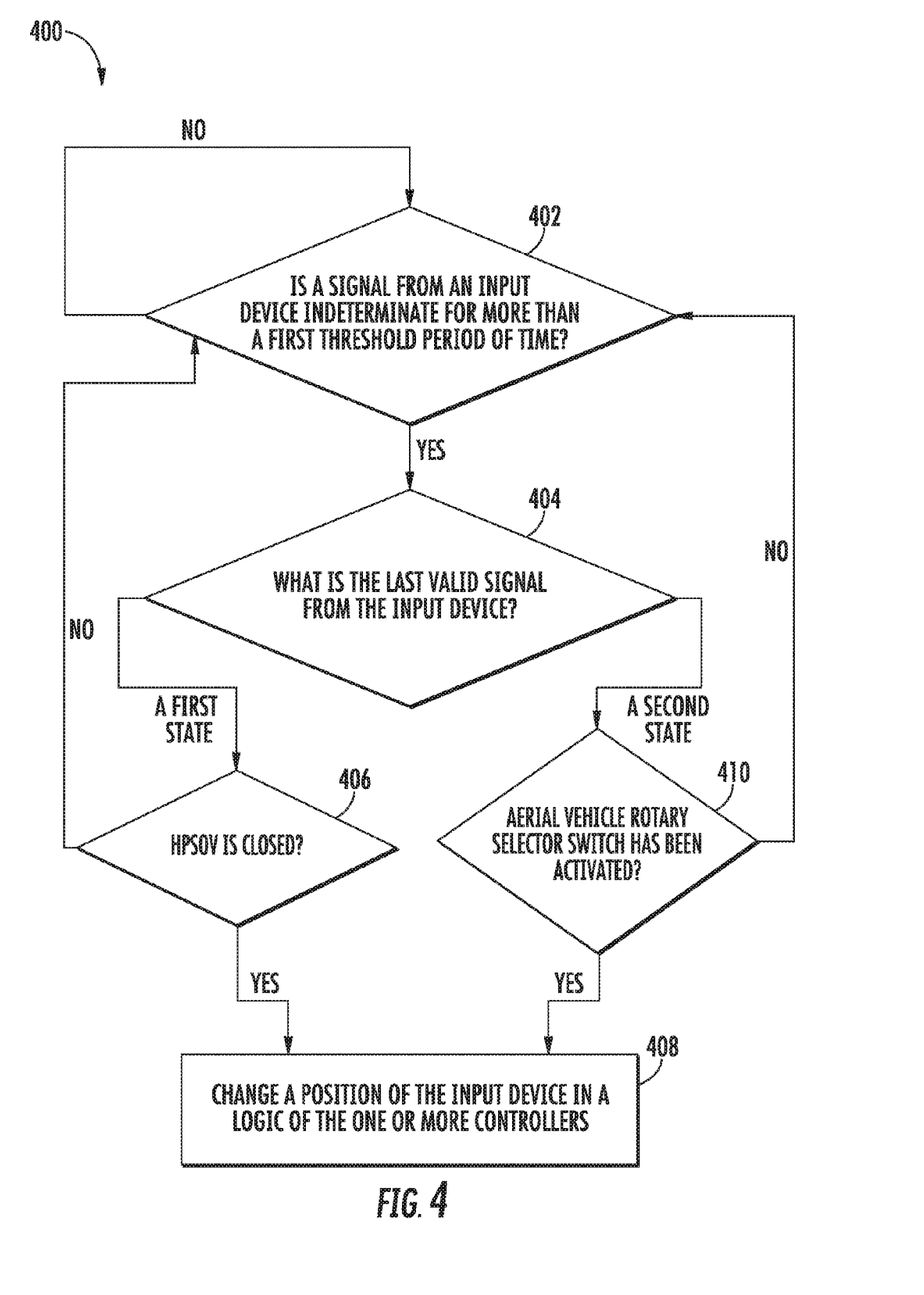
FIG. 4 depicts a flow diagram of an example method according to example embodiments of the present disclosure.

FIG. 4 depicts a flow diagram of an example method (400) for managing an input device for an aerial vehicle. The method of FIG. 4 can be implemented using, for instance, the control system 500 of FIG. 5. FIG. 4 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (402), a determination can be made of whether a signal from an input device is indeterminate for more than a first threshold period of time. For example, the control system 500 can determine whether a signal from an input device is indeterminate for more than a first threshold period of time. The input device can be a master lever switch. The first threshold period of time can be, for example, 500 milliseconds. Although 500 milliseconds is used as an example first threshold period of time, any other value can be used as the first threshold period of time. Determining whether a signal from the input device is indeterminate for more than a first threshold period of time can include determining at least one value from an engine interface unit (EIU) is indeterminate. The at least one value from the EIU can be from one of a bit 14 of the EIU or a bit 15 of the EIU. When a determination is made that a signal from the input device is not indeterminate for more than the first threshold period of time, the method 400 stays at (402). When a determination is made that a signal from the input device is indeterminate for more than the first threshold period of time, the method 400 moves to (404).

At (404), a determination is made of what was the last valid signal from the input device. For example, the control system 500 can determine what the last valid signal from the input device was. When a determination is made that the last valid signal from the input device was indicative of a first state, the method 400 can move to (406). The first state can be an ON state. When a determination is made that the last valid signal from the input device was indicative of a second state, the method 400 can move to (410). The second state can be an OFF state.

At (406), a determination can be made of whether a high pressure shut-off valve (HPSOV) is closed. For example, the control system 500 can determine whether the HPSOV is closed. Determining whether the HPSOV is closed can include evaluating two channels of the HPSOV for a position change. When a determination is made that the HPSOV is closed, the method 400 can move to (408). When a determination is made that the HPSOV is not closed, the method 400 can return to (402).

At (408), a position of the input device in a logic of one or more controllers can be changed. For example, the control system 500 can change a position of the input device in a logic of the control system 500. For example, when the last valid signal from the input device is ON, the position of the input device can be changed from ON to OFF in the logic of the one or more controllers. As another example, when the last valid signal from the input device is OFF, the position of the input device can be changed from OFF to ON in the logic of the one or more controllers. A full authority digital engine control (FADEC) can be and/or include the one or more controllers.

At (410), a determination can be made of whether an aerial vehicle rotary selector switch is activated. For example, the control system 500 can determine whether an aerial vehicle rotary selector switch is activated. When a determination is made that the aerial vehicle rotary selector switch is activated, the method 400 can move to (408). When a determination is made that the aircraft rotary selector switch is not activated, the method 400 can return to (402). Alternatively, at (410), a determination can be made of whether the aerial vehicle is in flight. For example, the control system 500 can determine whether the aerial vehicle is in flight. When the determination is that the aerial vehicle is in flight, a position of the input device in a logic of the one or more controllers can be maintained, and the method 400 can return to (402). When the determination is that the aerial vehicle is not in flight, a determination can be made of whether an aerial vehicle rotary selector switch is activated. For example, the control system 500 can determine whether an aerial vehicle rotary selector switch is activated. When a determination is made that the aerial vehicle rotary selector switch is activated, the method 400 can move to (408). When a determination is made that the aircraft rotary selector switch is not activated, the method 400 can return to (402).

Figure 5:
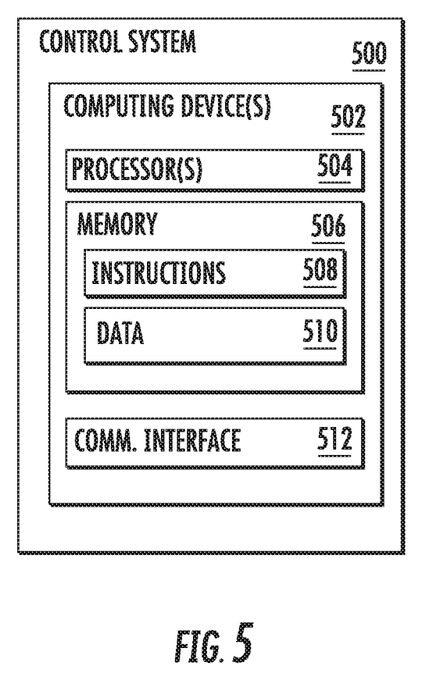
FIG. 5 depicts a computing system for implementing one or more aspects according to example embodiments of the present disclosure.

FIG. 5 depicts a block diagram of an example computing system that can be used to implement the control system 500 or other systems of the aerial vehicle 100 according to example embodiments of the present disclosure. As shown, the control system 500 can include one or more computing device(s) 502. The one or more computing device(s) 502 can include one or more processor(s) 504 and one or more memory device(s) 506. The one or more processor(s) 504 can include any suitable processing device, such as a microprocessor, microcontroller, integrated circuit, logic device, or other suitable processing device. The one or more memory device(s) 506 can include one or more computer-readable media, including, but not limited to, non-transitory computer-readable media, RAM, ROM, hard drives, flash drives, or other memory devices.

The one or more memory device(s) 506 can store information accessible by the one or more processor(s) 504, including computer-readable instructions 508 that can be executed by the one or more processor(s) 504. The instructions 508 can be any set of instructions that when executed by the one or more processor(s) 504, cause the one or more processor(s) 504 to perform operations. The instructions 508 can be software written in any suitable programming language or can be implemented in hardware. In some embodiments, the instructions 508 can be executed by the one or more processor(s) 504 to cause the one or more processor(s) 504 to perform operations, such as the operations for managing an input device for an aerial vehicle, as described with reference to FIGS. 2-4.

The memory device(s) 506 can further store data 510 that can be accessed by the processors 504. For example, the data 510 can include data from the one or more components, such as one or more controllers, a full authority digital engine control (FADEC), a high pressure shut-off valve (HPSOV), an aerial vehicle rotary selector switch, an engine interface unit (EIU), an input device, a master lever switch, and/or data from any other suitable component of an aerial vehicle, as described herein. The data 510 can include one or more table(s), function(s), algorithm(s), model(s), equation(s), etc. for managing an input device for an aerial vehicle according to example embodiments of the present disclosure.

The one or more computing device(s) 502 can also include a communication interface 512 used to communicate, for example, with the other components of system. The communication interface 512 can include any suitable components for interfacing with one or more network(s), including for example, transmitters, receivers, ports, controllers, antennas, or other suitable components.

Figure 6:
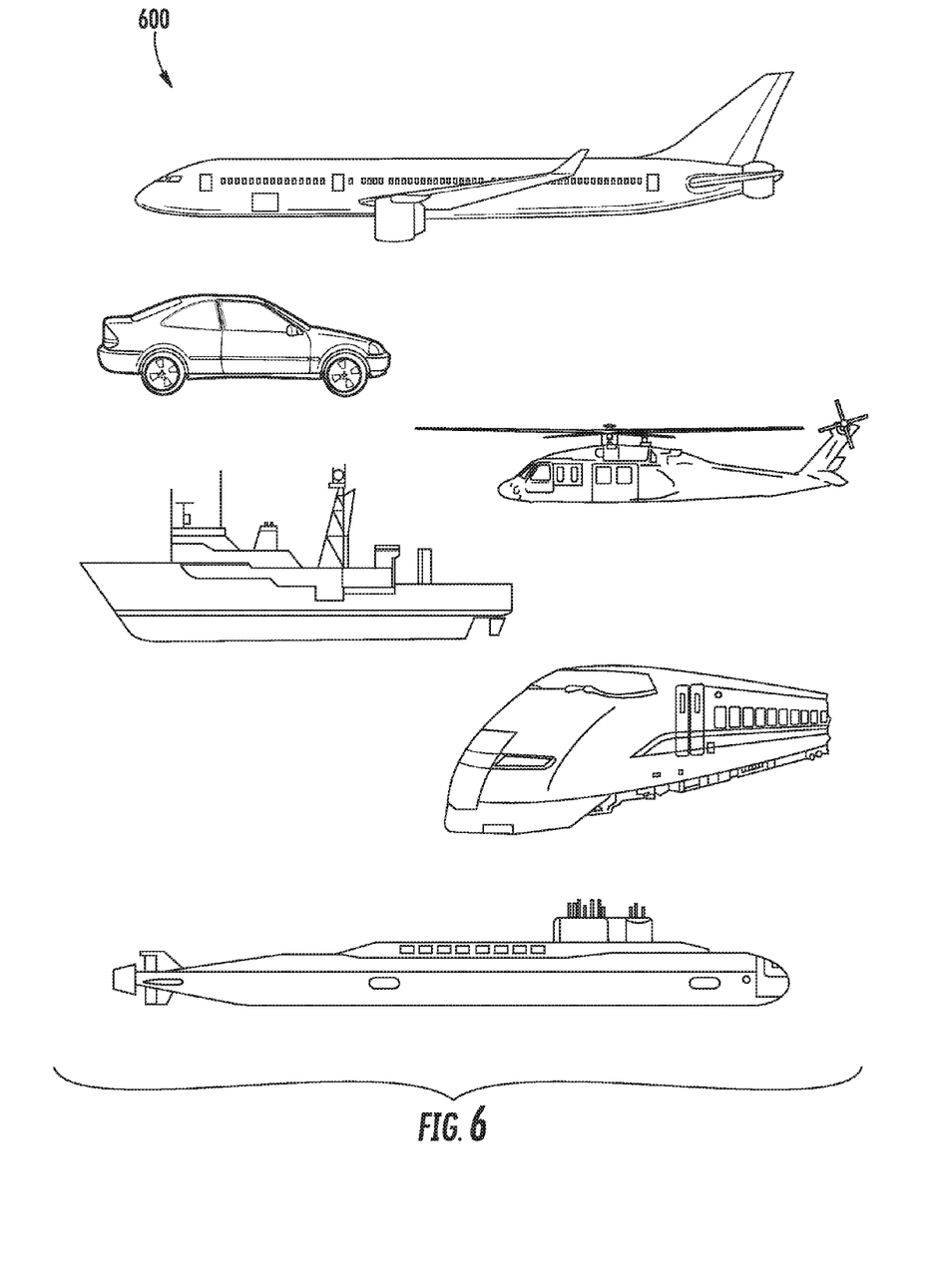
FIG. 6 depicts example vehicles according to example embodiments of the present disclosure.

Referring now to FIG. 6, example vehicles 600 according to example embodiments of the present disclosure are depicted. The systems and methods of the present disclosure can be implemented on an aircraft, helicopter, automobile, boat, submarine, train, and/or any other suitable vehicles. While the present disclosure is described herein with reference to an aircraft implementation, this is intended only to serve as an example and not to be limiting. One of ordinary skill in the art would understand that the systems and methods of the present disclosure can be implemented on other vehicles without deviating from the scope of the present disclosure.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for managing an input device for an aerial vehicle comprising:
   determining, by one or more controllers, whether a signal from the input device is indeterminate for more than a first threshold period of time; and
   when the signal from the input device is indeterminate for more than the first threshold period of time:
      determining, by the one or more controllers, a last valid signal from the input device; and
      when the last valid signal from the input device is indicative of a first state:
         determining, by the one or more controllers, whether a high pressure shut-off valve (HPSOV) is closed within a second threshold period of time; and
         when the HPSOV is closed within the second threshold period of time, changing a position of the input device in a logic of the one or more controllers.

2. The method of claim 1, further comprising:
   when the signal from the input device is indeterminate for more than the first threshold period of time and when the last valid signal from the input device is indicative of a second state:
   determining, by the one or more controllers, whether an aerial vehicle rotary selector switch is activated within a third threshold period of time; and
   when the aerial vehicle rotary selector switch is activated within the third threshold period of time, changing a position of the input device in a logic of the one or more controllers.

3. The method of claim 2, wherein the third threshold period of time is two minutes.

4. The method of claim 1, further comprising:
   when the signal from the input device is indeterminate for more than the first threshold period of time and when the last valid signal from the input device is indicative of a second state:
   determining, by the one or more controllers, whether the aerial vehicle is in flight;
   when the aerial vehicle is in flight, maintaining a position of the input device in a logic of the one or more controllers; and
   when the aerial vehicle is not in flight:
      determining, by the one or more controllers, whether an aerial vehicle rotary selector switch is activated within a third threshold period of time; and
      when the aerial vehicle rotary selector switch is activated within the third threshold period of time, changing a position of the input device in a logic of the one or more controllers.

5. The method of claim 4, wherein the third threshold period of time is two minutes.

6. The method of claim 1, wherein the first threshold period of time is 500 milliseconds.

7. The method of claim 1, wherein the second threshold period of time is 5 seconds.

8. The method of claim 1, wherein determining whether a signal from the input device is indeterminate for more than a first threshold period of time further comprises determining at least one value from an engine interface unit (EIU) is indeterminate.

9. The method of claim 8, wherein the at least one value from the EIU is from one of a bit 14 of the EIU or a bit 15 of the EIU.

10. The method of claim 1, wherein determining whether a high pressure shut-off valve (HPSOV) is closed within a second threshold period of time further comprises evaluating two channels of the HPSOV for a position change.

11. The method of claim 1, wherein the input device is a master lever switch.

12. The method of claim 1, wherein a full authority digital engine control (FADEC) comprises the one or more controllers.

13. A system for managing an input device for an aerial vehicle comprising:
an input device;
a high pressure shut-off valve (HPSOV); and
one or more controllers configured to:
determine whether a signal from the input device is indeterminate for more than a first threshold period of time; and
when the signal from the input device is indeterminate for more than the first threshold period of time:
determine a last valid signal from the input device; and
when the last valid signal from the input device is indicative of a first state:
determine whether the HPSOV is closed within a second threshold period of time; and
when the HPSOV is closed within the second threshold period of time, change a position of the input device in a logic of the one or more controllers.

14. The system of claim 13, further comprising:
an aerial vehicle rotary selector switch; and
when the signal from the input device is indeterminate for more than the first threshold period of time and when the last valid signal from the input device is indicative of a second state, the one or more controllers are further configured to:
determine whether the aerial vehicle rotary selector switch is activated within a third threshold period of time; and
when the aerial vehicle rotary selector switch is activated within the third threshold period of time, change a position of the input device in a logic of the one or more controllers.

15. The system of claim 14, wherein the third threshold period of time is two minutes.

16. The system of claim 13, further comprising:
an aerial vehicle rotary selector switch; and
when the signal from the input device is indeterminate for more than the first threshold period of time and when the last valid signal from the input device is indicative of a second state, the one or more controllers are further configured to:
determine whether the aerial vehicle is in flight;
when the aerial vehicle is in flight, maintain a position of the input device in a logic of the one or more controllers; and
when the aerial vehicle is not in flight:
determine whether the aerial vehicle rotary selector switch is activated within a third threshold period of time; and
when the aerial vehicle rotary selector switch is activated within the third threshold period of time, change a position of the input device in a logic of the one or more controllers.

17. The system of claim 16, wherein the third threshold period of time is two minutes.

18. The system of claim 13, wherein the first threshold period of time is 500 milliseconds.

19. The system of claim 13, wherein the second threshold period of time is 5 seconds.

20. A vehicle comprising:
an input device;
a high pressure shut-off valve (HPSOV); and
one or more controllers configured to:
determine whether a signal from the input device is indeterminate for more than a first threshold period of time; and
when the signal from the input device is indeterminate for more than the first threshold period of time:
determine a last valid signal from the input device; and
when the last valid signal from the input device is indicative of first state:
determine whether the HPSOV is closed within a second threshold period of time; and
when the HPSOV is closed within the second threshold period of time, change a position of the input device in a logic of the one or more controllers.

* * * * *